United States Patent [19]

Holánek et al.

[11] 4,146,480

[45] Mar. 27, 1979

[54] HEMICAPILLAR PLATE DIALYZER

[75] Inventors: Stanislav Holánek; Valter Jakubek, both of Brno, Czechoslovakia

[73] Assignee: Chirana, koncern, Stara Tura, Czechoslovakia

[21] Appl. No.: 826,714

[22] Filed: Aug. 22, 1977

[51] Int. Cl.² ............................................. C02B 1/82
[52] U.S. Cl. ............................ 210/232; 210/321 B
[58] Field of Search .......... 210/321 R, 321 B, 500 M, 210/22, 23, 493, 232

[56] References Cited

U.S. PATENT DOCUMENTS

| | | | |
|---|---|---|---|
| 3,585,131 | 6/1971 | Esmond | 210/321 B |
| 3,724,673 | 4/1973 | Ryon | 210/500 M |
| 3,805,960 | 4/1974 | Butruille et al. | 210/321 B |
| 3,827,563 | 8/1974 | Boe et al. | 210/321 B |
| 3,839,204 | 10/1974 | Ingenito et al. | 210/321 B X |

Primary Examiner—Ferris H. Lander

[57] ABSTRACT

A hemicapillar plate dialyzer comprising blood plates and dialyzer plates, with semipermeable diaphragms between said plates, provided with means to achieve a laminar flow of blood and a turbulent flow of the dialyzing solution by using a number of interrupted linear profiles on dialyzing plates and linear uninterrupted profiles on blood plates of rounded cross section, said dialyzing and blood plates being made of material of different hardnesses, with means for clamping said plates, and for the supply and removal of blood and of the dialyzing solution.

3 Claims, 11 Drawing Figures

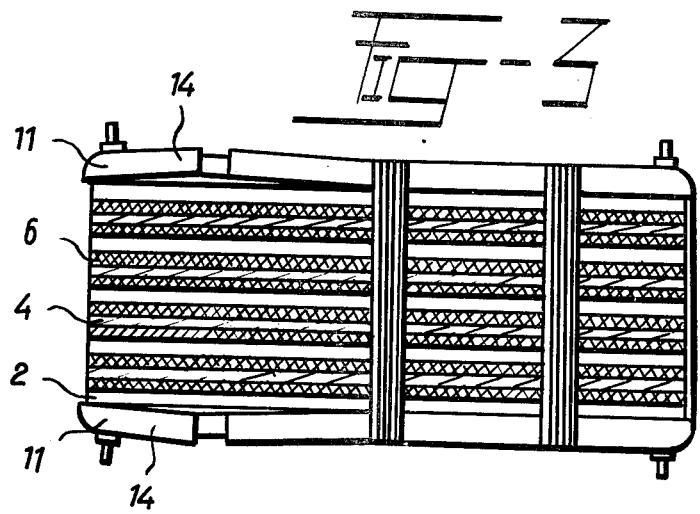
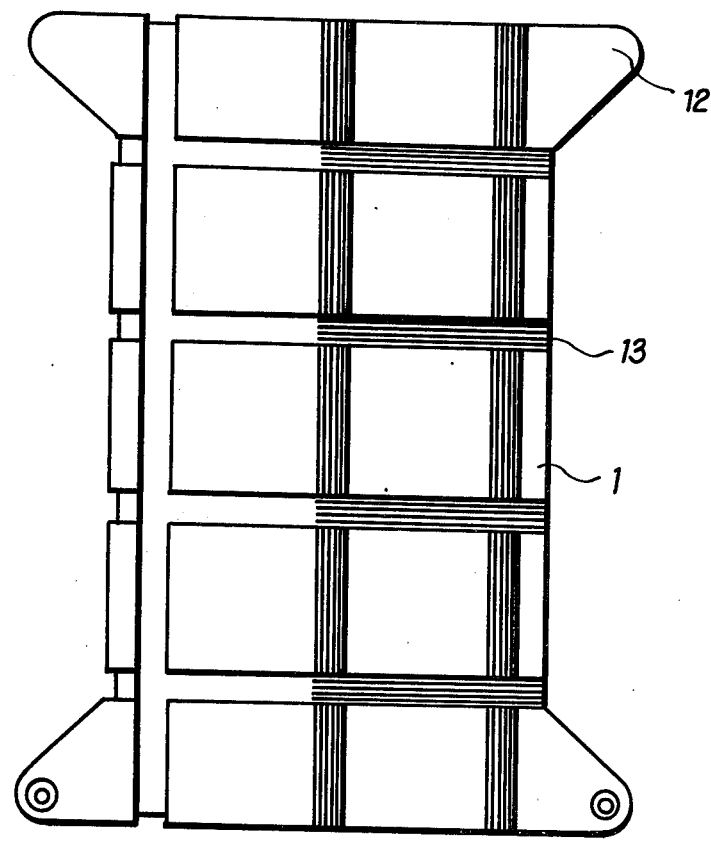

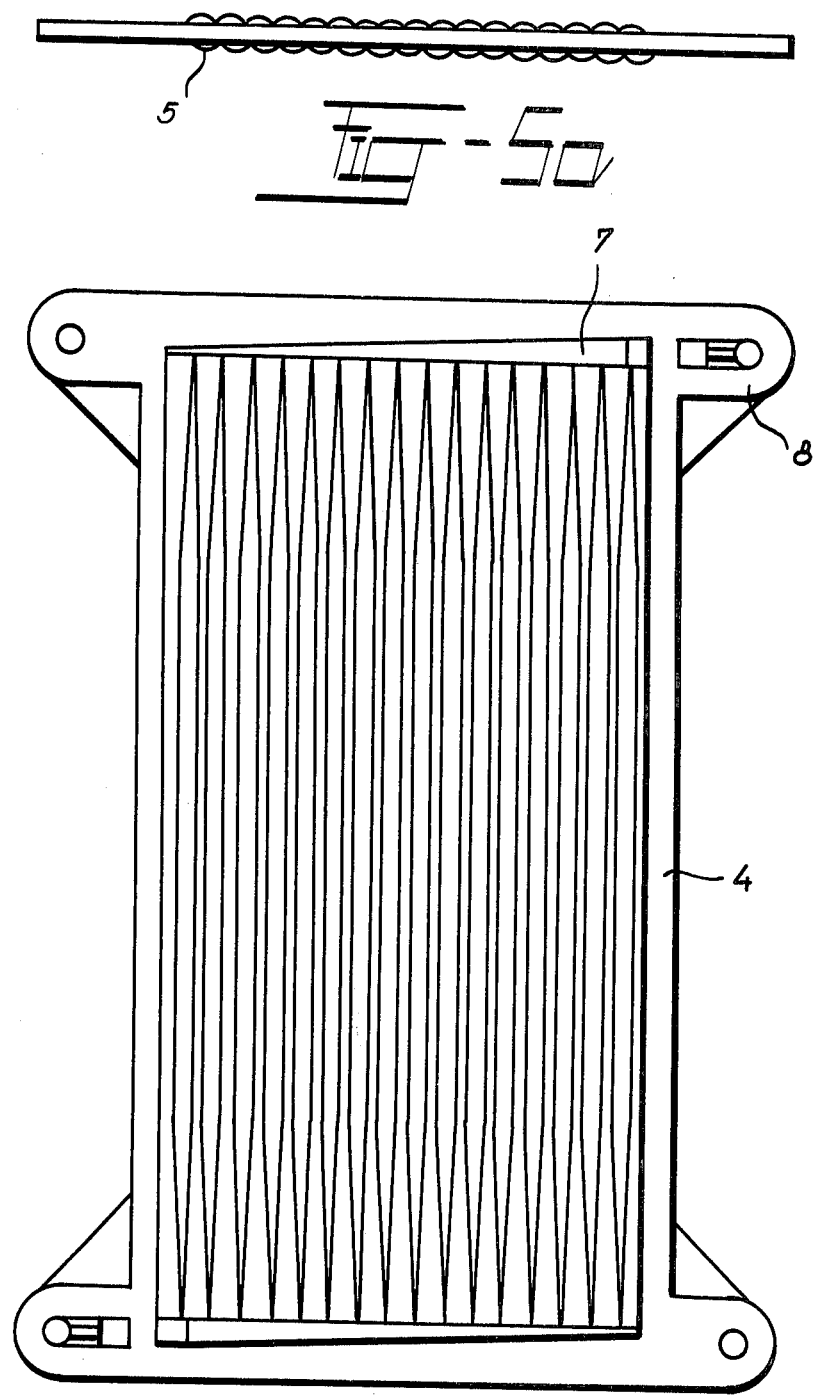

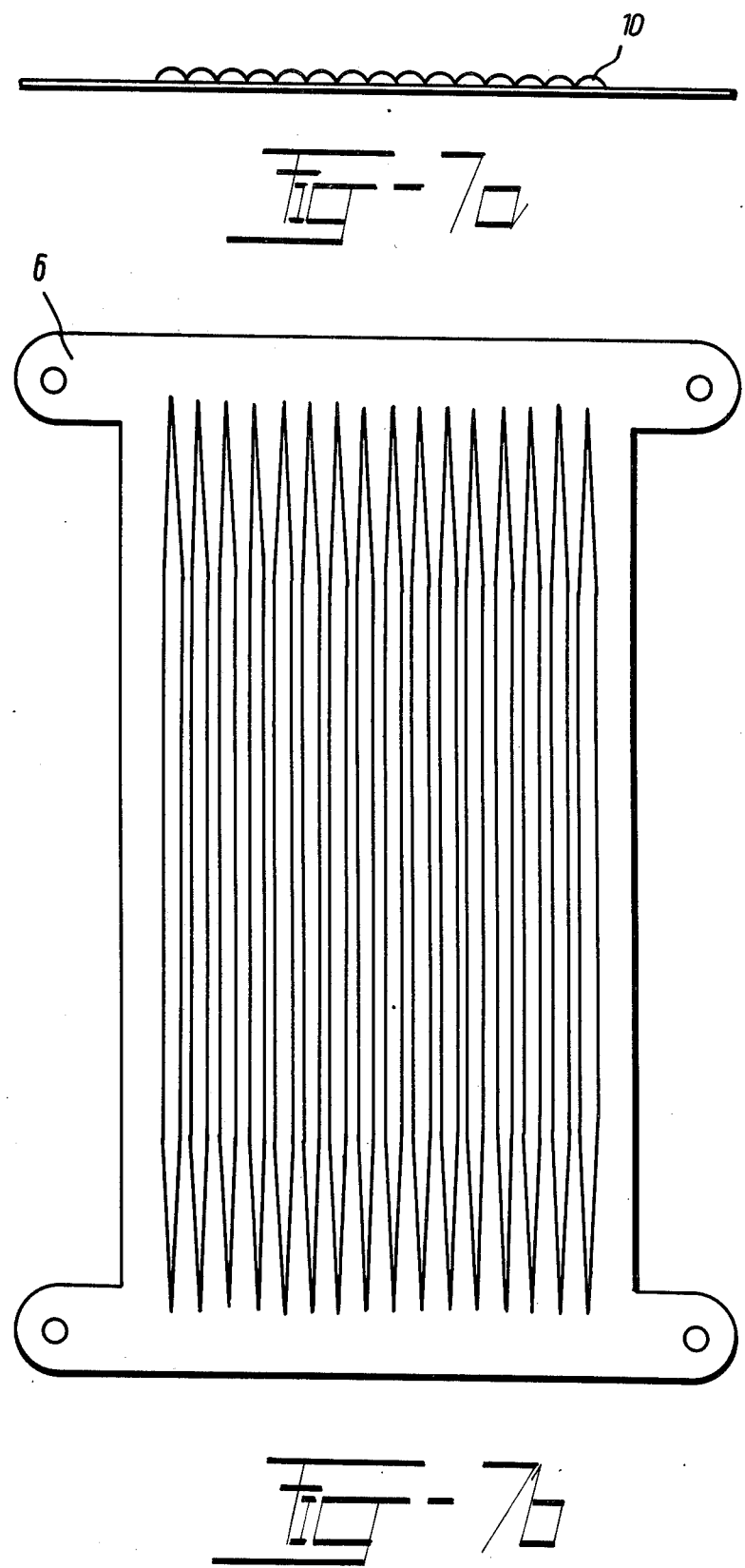

HEMICAPILLAR PLATE DIALYZER

BACKGROUND OF THE INVENTION

This invention relates to a hemicapillar plate dialyzer, made of plastic materials, the active plates thereof securing on one side a turbulent flow of the dialyzing solution and on the other side a laminar flow of blood, whereby the supply and removal of both media are guided so as to secure a uniform filling of contact surfaces of the plates without forming static zones.

The dialyzer is the main part of a system called an "artificial kidney" for the treatment of failures of the kidneys in cases where the kidney function fails due to some injury, due to toxic harm, or due to a sudden or chronic inflammation. Without the normal function of the kidney due to poisoning by nitrogenous compounds, or due to the accumulation of potassium or of other body liquids, the patient dies.

In such cases the equilibrium of the internal constitution of the organism of the patient may be restored by hemodialysis by means of a dialyzer of the coil type, the plate type, or of the capillary type, the dialyzer acting as a filter and eliminating from the human body products of nitrogen metabolism and adjusts the volume of body liquids and electrolytes.

A disadvantage of known dialyzers is the substantial screening of the semipermeable diaphragm, which has to be offset by an increase of the overall weight of the dialyzer; further drawbacks reside in the unfavorable hydrodynamics of the flow of blood and of the dialyzing solution. Thus along the blood channels on the diaphragm there may be formed a stagnant slowly flowing limit layer of blood, such layer being thicker the slower the blood flows. This means that molecules of the offending materials have to pass not only through pores of the semipermeable diaphragm, but must overcome also the resistance of the stable layer of liquids on both sides of the diaphragm. The inlet and outlet of blood and of the dialyzing solution does not always insure with known solutions a full utilization of the contact surfaces, and static zones are created, which may cause an agglutination of blood. There are, furthermore, problems with the tightness of the whole system of the dialyzer, where rather high press forces are required in order to secure the tightness of the system; this entails the danger of breaking the relatively fragile diaphragms. The problem of tightness of the whole system results from the fact that the plates are made of materials of equal hardness, with inaccuracies of manufacture. A consequence thereof is that the plates do not mutually adjust in shape even though a high press force is used in the system. The high press force has to be compensated for by a more complex construction of the dialyzer, which results in a higher weight of the dialyzer. For this reason, high demands are made on dialyzers and on their arrangement, namely;

1. The effect of hemodialysis has to be satisfactory, even for small amounts of blood in the dialyzer.
2. The resistance to blood flow has to be as low as possible in order that a blood pump shall not be required.
3. The residue of blood in the dialyzer after treatment of the patient should be so small, that it would not be required to supply the patient with compensatory blood, thereby overcoming the danger of contracting jaundice or hepatitis.
4. The attendant of the artificial kidney should be protected from contact with blood or with the dialyzing solution, also to prevent any transmission of jaundice or hepatitis.
5. The overall weight of the dialyzer should be as small as possible, and its components should be capable of being mass produced in order that it shall be used only once to prevent any danger of cross infection.
6. The passage of blood should be laminar, and the passage of the dialyzing solution should be turbulent, and should be uniform in both the longitudinal and transverse directions in order fully to utilize the contact surfaces without the creation of static zones.
7. The dialyzer has to form a part of a closed system which includes the patient.
8. In order to achieve an effective cleaning of blood the dialyzer has to consist of a selectable number of similar components assembled by a simple manipulation.
9. The diaphragms have to be securely mounted in the system, without undue stress, in order to reduce the danger of breakage.
10. The dialyzer must be perfectly tight and its arrangement should prevent any direct contact of blood with the dialyzing solution.

SUMMARY OF THE INVENTION

It is an object of this invention to provide a hemicapillar plate dialyzer which meets the above enumerated requirements to a high degree.

The hemicapillar plate dialyzer according to this invention comprises blood plates and dialyzer plates separated by a diaphragm, the dialyzer plates being provided on their surfaces, for obtaining a turbulent flow of the dialyzing solution, with linearly arranged extending interrupted supports of advantageously assymetric shape on both sides, and the blood plates being provided with linear protruding rounded uninterrupted profiles for obtaining a laminar flow of blood, a semipermeable diaphragm being inserted between said plates. The plates are made of plastic materials of different hardnesses, the projecting supports and the rounded profiles of the plates being connected to distribution channels with a gradually narrowing profile from the inlet of the liquid to the end of its track, thus securing a uniform filling and removal of liquids to and from contact surfaces of the plates along the whole surface of the blood and dialyzer plates without the danger of the creation of unwanted stagnant zones.

DESCRIPTION OF THE DRAWINGS

In the attached drawings, which illustrate an examplary embodiment of a dialyzer according to this invention:

FIG. 2 is an elevational view of the dialyzer with a part of the clamping bands applied thereto;

FIG. 3 is a top view of the dialyzer corresponding to the elevation in FIG. 2;

FIGS. 5a and 5b are a top view and an elevation, respectively, of a blood plate;

FIGS. 7a and 7b are a top view and an elevation, respectively, of a diaphragm.

DESCRIPTION OF PREFERRED EMBODIMENTS

Figure 1:
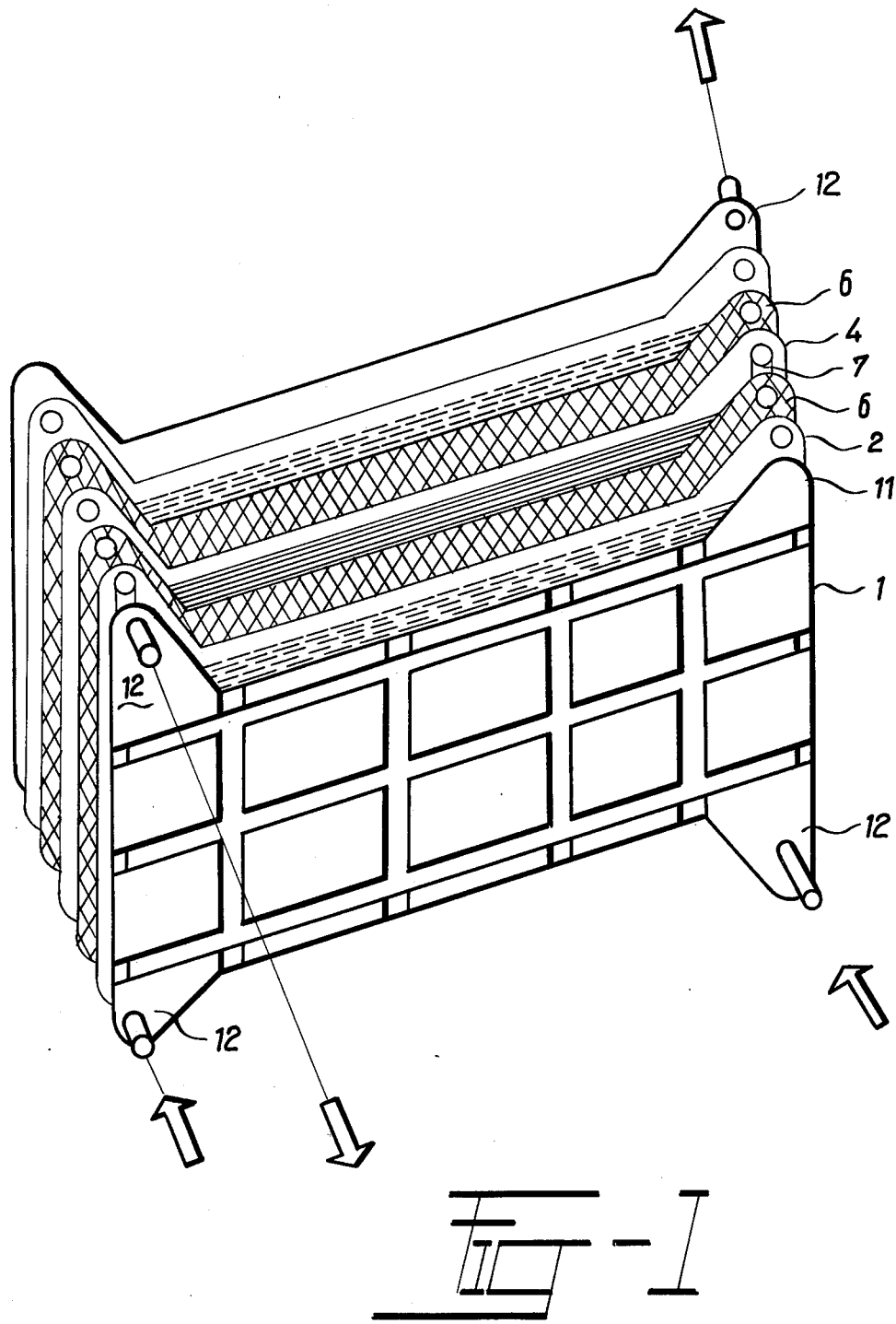
FIG. 1 is an exploded view of the arrangement of dialyzer plates.

Turning now to FIG. 1, the dialyzer as shown comprises an arbitrary number of blood plates 4 and of dialyzer plates 2 with a semipermeable diaphragm 6 inserted between successive pairs of plates 2 and 4. The dialyzer operates advantageously on the counter-current principle, and is provided with means to connect it to a source of a dialyzing solution on one side, and means to connect it to the blood circulation system of a patient on the other side.

Figure 4:
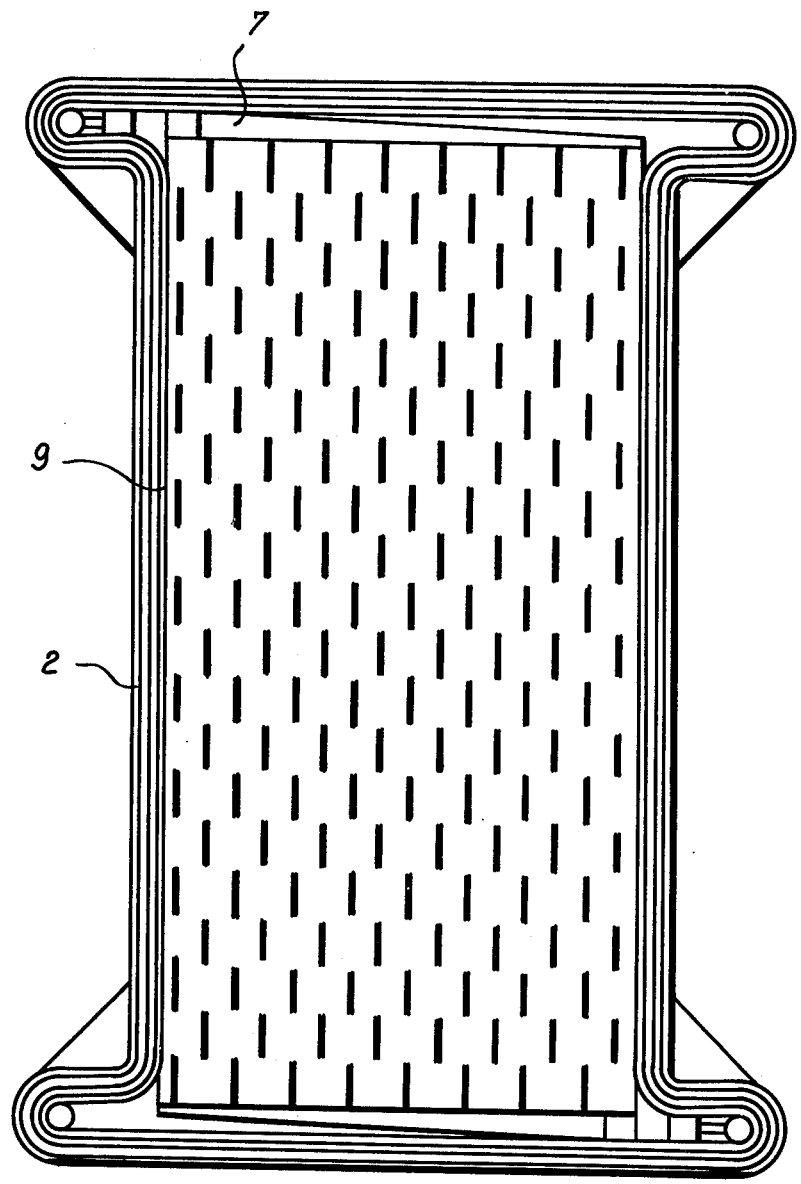
FIG. 4 is an elevation of a dialyzer plate.
Figure 6A:
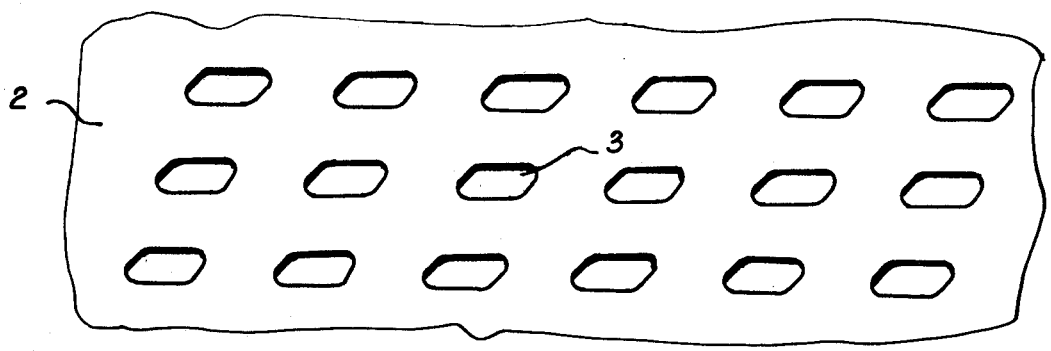
FIGS. 6a, 6b and 6c depict different arrangements of the projecting supports of dialyzer plates.
Figure 6B:
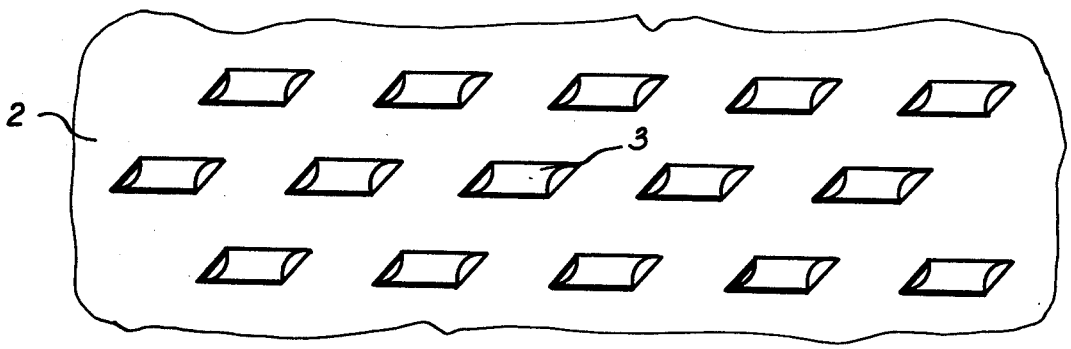
Figure 6C:
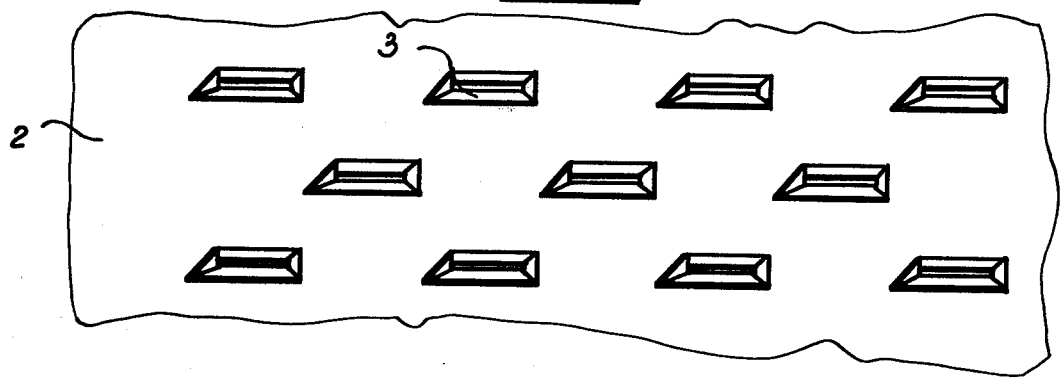

The system comprises a number of modules, each module consisting of a blood plate 4 (FIG. 5) with uninterrupted, rounded, extending longitudinal profiles 5 securing a laminar flow of blood, and of a dialyzer plate 2 (FIG. 4) with a number of assymetrically arranged point supports 3, which may have a shape such as shown in any of FIGS. 6a, 6b, and 6c, and semipermeable diaphragm 6 inserted between plates 2 and 4. Supports 3 secure a turbulent flow of the dialyzing solution. By stacking a predetermined number of modules and by using closing plates 11, there is provided a dialyzer system with a desired number of standard components with a predetermined active surface area.

The diaphragm 6 shown in FIG. 7 is, prior to insertion between the active plates 2 and 4, preformed to a profile corresponding to the active plates, thus preventing unwanted wrinkling of its circumference. The preforming of the diaphragm 6 mainly prevents the possibility of its breaking upon the clamping of modules between the closing plates 11 of the dialyzer.

The circumferential sealing surface 8 of the blood plate 4 is flat, and the circumferential surface of the dialyzer plate 2 is formed as a twin labyrinth or multi-ribbed structure 9 or vice versa. This substantially reduces the projected sealing surface, thereby reducing the clamping force required for tightening the whole system. The possibility of a rupture of the diaphragm is also reduced, and any unwanted contact of blood with the dialyzing solution is prevented.

By its arrangement the hemicapillary plate dialyzer according to this invention substantially reduces the thickness of the blood layer, thereby creating a many times thinner barrier for diffusing compounds than is possible with known systems. The thin layer of blood film results in good hydrodynamics of blood flow, so that the diffuser may be used in a predominant number of cases without a blood pump, thereby eliminating a substantial stress upon the blood circulation system of the patient.

Good hydrodynamics of both media in the hydrolyzer according to this invention are obtained by accurate profiles of active plates 2 and 4, which can be reproduced in manufacture, whereby a uniform filling of the contact surfaces of the plates is secured by distributing channels 7 of plates 2 and 4. Channels 7 are gradually narrowed from the inlet of the media to the end of the respective tracks, and thus insure a uniform filling of the surfaces of plates 2 and 4 along the whole blood and dialyzer surface without the danger of creating unwanted stagnant zones.

The small blood volume in the dialyzer according to this invention, the low resistance to its passage through the dialyzer system, and the small residual volume of blood after dialysis is finished, reduces the work required of the patient's heart, permits a reduction of the pressure drop in the dialyzer, thus simultaneously reducing ultrafiltration and traumatization of red blood corpuscles.

The assembled modules of active plates 2 and 4 of the dialyzer according to this invention as shown in FIGS. 2 and 3, which are separated by a diaphragm 6, are forcibly clamped together between closing plates 11 the outer surface of which is of a lattice design, by means of bands 13 (see FIG. 2), said bands 13 being arranged spaced from each other both in the longitudinal and transverse directions in order to secure a perfect tightness of the system.

The closing plates 11 are provided with extensions 12, in which nipples are provided for the inlet and outlet of blood and other nipples are provided for the inlet and outlet of the dialyzing solution. In FIG. 1 one of the media (blood or dialyzing solution) is depicted by dark arrows as entering and leaving the dialyzer at a first pair of opposite corners, and the other of the media is shown entering and leaving the dialyzer by the other pair of opposite corners. At least some of the opposite extensions shown at 14 in FIG. 3, may be somewhat inclined toward each other in order to create a prestress for clamping the dialyzer by bands 13 and thus to increase the clamping force in these exposed places. By this solution the tightness of the whole dialyzer system is better secured and its weight reduced, with advantages of economy, manipulation, storing and destruction by burning.

The active dialyzer plates according to this invention are advantageously made of plastics of different hardnesses, so that in case of clamping the modules made thereof between closing plates a mutual forming of the plates by adjustment of the material of the active plates along the plate interfaces is accomplished, whereby inaccuracies of manufacture of individual parts are also adjusted. Simultaneously, a reduction of weight is achieved due to the smaller clamping force required and a better maintenance of tightness of the system over a normal storage period.

In the last manufacturing operation the plate dialyzer according to this invention is forcibly clamped by means of bands 13 (FIG. 2) made of plastic material, the bands being advantageously provided with reinforcements of glass or graphite fibers, thereby preventing their elongation in case of dynamic stresses and maintaining the tightness of the system over long periods of time. This construction also contributes to a reduction of weight of the dialyzer with all the advantages attendant thereupon.

The plate dialyzer according to this invention fulfills all conditions for an effective hemodialysis, and provides perfect reproducibility in mass production, that bringing about substantial advantages in economy and health service.

The dialyzer of the invention may be used to advantage not only for hemodialysis, but, by changing the diaphragm of the dialyzer, it may also serve as an oxygenator for breast surgery, in case of a sudden need therefor, and may be used in laboratories and industry for filtering, ultrafiltering, osmosis, reverse osmosis, separation of analytically dispersed materials, and the like.

Although the invention is illustrated and described with reference to a single preferred embodiment thereof, it is to be expressly understood that it is in no way limited by the disclosure of such single embodiment, but is capable of numerous modifications within the scope of the appended claim.

What is claimed is:

1. A hemicapillar plate dialyzer comprising at least a single module including a blood plate, a dialyzer plate, and a semipermeable diaphragm between said plates, and closing plates clamping the plates of the module tightly together, means for the supply and removal of blood to and from the surface of the blood plate, means for the supply and removal of the dialyzing solution to and from the surface of the dialyzer plate, successive plates of the module forming channels narrowing towards their ends provided at each end of each plate for a uniform supply and removal of liquids to and from the whole surface of the plates, the dialyzer plate being provided with linearly arranged interrupted extensions, the blood plate being provided with linear uninterrupted rounded extensions, the blood plate and the dialyzer plate being made of plastic materials having different hardnesses, wherein the confronting circumferential parts of both plates adjust under clamping pressure for sealing their internal parts, one of said plates having a flat circumferential part, the confronting circumferential part of the other plate being of a labyrinth shape, the semipermeable diaphragm prior to being inserted between the plates is preformed to a profile corresponding to the profile of the contact surfaces of said plates and the modules enclosed by the closing plates are clamped by spaced bands made of plastic material, said bands being reinforced by reinforcing strands which prevent the extension of the bands.

2. A hemicapillar plate dialyzer as claimed in claim 1, wherein the closing plates are provided with extensions which are slightly inclined toward each other and away from the main plane of the closing plates, whereby to create a pre-stress for clamping the plates of the dialyzer together.

3. A hemicapillar plate dialyzer as claimed in claim 1, wherein the modules enclosed by the closing plates are clamped by spaced bands made of plastic material, said bands being reinforced by reinforcing strands which prevent the extension of the bands, and wherein the closing plates are provided with extensions which are slightly inclined toward each other and away from the main plane of the closing plates, whereby to create a pre-stress for clamping the plates of the dialyzer together.

* * * * *